United States Patent
Hofmann et al.

[11] Patent Number: 5,881,983
[45] Date of Patent: Mar. 16, 1999

[54] HAIR DRYER POSITIONING SYSTEM

[76] Inventors: Larry E. Hofmann; Francis F. Hofmann, both of 2812 Glenway Dr., Maryland Heights, Mo. 63043

[21] Appl. No.: 110,912

[22] Filed: Jul. 6, 1998

[51] Int. Cl.[6] ...................................................... E04G 3/00
[52] U.S. Cl. ..................................... 248/274.1; 248/176.1
[58] Field of Search .................................. 34/90, 91, 96, 34/97, 233; 248/532, 274.1, 176.1

[56] References Cited

U.S. PATENT DOCUMENTS

| | | | |
|---|---|---|---|
| 2,510,198 | 10/1950 | Tesmer | 248/274.1 |
| 4,159,773 | 7/1979 | Losenno | 211/60 |
| 4,195,416 | 4/1980 | Hall | 34/90 |
| 4,712,313 | 12/1987 | Gehleman | 34/97 |
| 4,802,287 | 2/1989 | Chen | 34/91 |
| 5,590,475 | 1/1997 | Andis | 34/97 |
| 5,592,749 | 1/1997 | Trimmer | 34/97 |
| 5,613,305 | 3/1997 | Narrin | 34/90 |
| 5,761,825 | 6/1998 | Ammon et al. | 34/97 |

*Primary Examiner*—Henry Bennett
*Assistant Examiner*—Pamela A. Wilson
*Attorney, Agent, or Firm*—Joseph N. Breaux

[57] ABSTRACT

A hair dryer positioning system includes a detachable, bendable, shape retaining, dryer positioning arm having a connecting fitting at a bottom end thereof and a flexible dryer cradle member with securing straps at a top end thereof; a hollow, dome-shaped base cover member with a connecting bracket at the top center thereof that is mateable with the connecting fitting of the positioning arm; and a weighted base member with a threaded perimeter lip and at least one screw mount aperture formed through a bottom surface thereof; the hollow, dome-shaped base cover member including an internally threaded base member engaging lip companionately threaded to engage the threaded perimeter lip of the weighted base member and a positioning arm storage compartment formed therein sized to receive therein the dryer positioning arm including the connecting fitting and the flexible dryer cradle member with securing straps; the connecting fitting including two L-shaped connecting members; the connecting bracket having two L-shaped connecting member receiving channels formed therein for receiving laterally therein the two L-shaped connecting members of the connecting fitting.

18 Claims, 3 Drawing Sheets

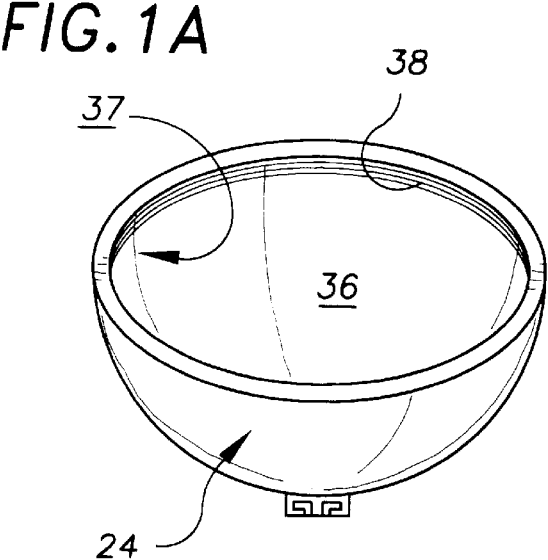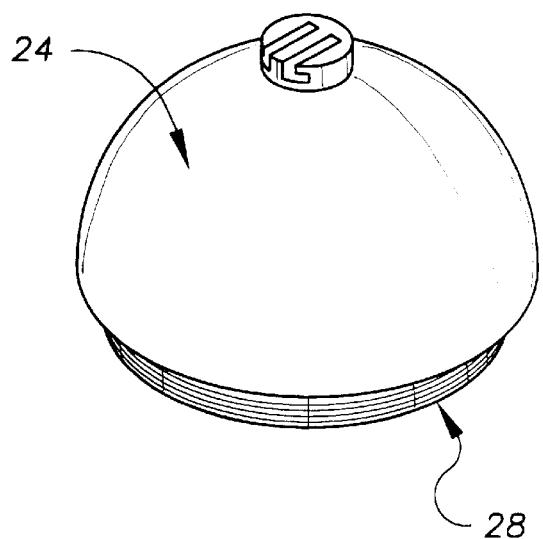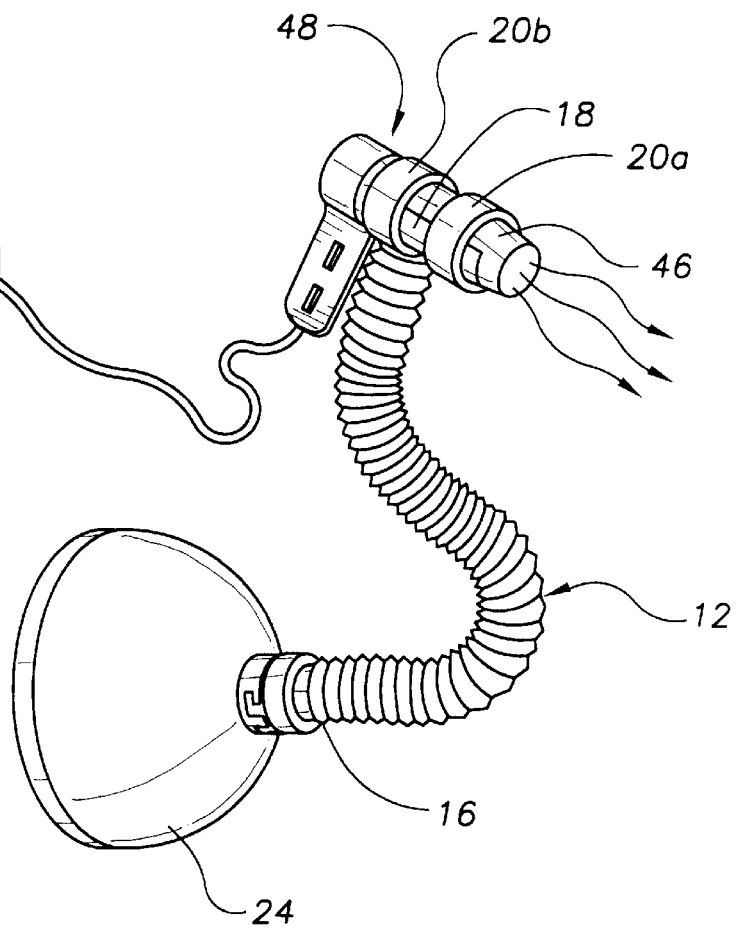

HAIR DRYER POSITIONING SYSTEM

TECHNICAL FIELD

The present invention relates to appliance positioning devices and more particularly to a hair dryer positioning system for supporting and holding the discharge barrel of a hand held hair dryer in user set positions so as to free the user's hands for hair styling use; the hair dryer positioning system including a detachable, bendable, shape retaining, dryer positioning arm having a connecting fitting at a bottom end thereof and a flexible dryer cradle member with securing straps at a top end thereof; a hollow, dome-shaped base cover member with a connecting bracket at the top center thereof that is mateable with the connecting fitting of the positioning arm; and a weighted base member with a threaded perimeter lip and at least one screw mount aperture formed through a bottom surface thereof; the hollow, dome-shaped base cover member including an internally threaded base member engaging lip companionately threaded to engage the threaded perimeter lip of the weighted base member and a positioning arm storage compartment formed therein sized to receive therein the dryer positioning arm including the connecting fitting and the flexible dryer cradle member with securing straps; the connecting fitting including two L-shaped connecting members; the connecting bracket having two L-shaped connecting member receiving channels formed therein for receiving laterally therein the two L-shaped connecting members of the connecting fitting.

BACKGROUND ART

It can be difficult to achieve some hairstyles without assistance. The assistance is required to hold the discharge barrel of a hair dryer oriented at the hair while teasing, combing or otherwise performing hair styling activities that require the use of two hands. It would be a benefit, therefore, to have a hair dryer positioning system that could be attached to a hair dryer that included a support arm for holding the discharge barrel of a hair dryer at a user selected position and orientation. Because it can be desirable to move the hair dryer about the user, it would also be desirable to have hair dryer positioning system that included a base that could be positioned on a table or mounted on a door or wall depending on the needs of the user. Because it often necessary to perform hair styling activities when away from home, it would be a further benefit to have a dryer positioning system that included a base within which the components of the system could be stored for easy packing or carrying in a purse or handbag.

GENERAL SUMMARY DISCUSSION OF INVENTION

It is thus an object of the invention to provide a hair dryer positioning system that includes a support arm that is attachable to a hair dryer and that can hold the discharge barrel of a hair dryer at a user selected position and orientation.

It is a further object of the invention to provide a hair dryer positioning system that includes a base that is positionable on horizontal surfaces such as table tops and mountable on vertical surfaces such as doors or walls depending on the needs of the user.

It is a still further object of the invention to provide a hair dryer positioning system that includes a base having a compartment formed therein within which the other components of the hair dryer positioning system are storable.

It is a still further object of the invention to provide a hair dryer positioning system that includes a detachable, bendable, shape retaining, dryer positioning arm having a connecting fitting at a bottom end thereof and a flexible dryer cradle member with securing straps at a top end thereof; a hollow, dome-shaped base cover member with a connecting bracket at the top center thereof that is mateable with the connecting fitting of the positioning arm; and a weighted base member with a threaded perimeter lip and at least one screw mount aperture formed through a bottom surface thereof; the hollow, dome-shaped base cover member including an internally threaded base member engaging lip companionately threaded to engage the threaded perimeter lip of the weighted base member and a positioning arm storage compartment formed therein sized to receive therein the dryer positioning arm including the connecting fitting and the flexible dryer cradle member with securing straps; the connecting fitting including two L-shaped connecting members; the connecting bracket having two L-shaped connecting member receiving channels formed therein for receiving laterally therein the two L-shaped connecting members of the connecting fitting.

It is a still further object of the invention to provide a hair dryer positioning system that accomplishes some or all of the above objects in combination.

Accordingly, a hair dryer positioning system is provided. The hair dryer positioning system includes a detachable, bendable, shape retaining, dryer positioning arm having a connecting fitting at a bottom end thereof and a flexible dryer cradle member with securing straps at a top end thereof; a hollow, dome-shaped base cover member with a connecting bracket at the top center thereof that is mateable with the connecting fitting of the positioning arm; and a weighted base member with a threaded perimeter lip and at least one screw mount aperture formed through a bottom surface thereof; the hollow, dome-shaped base cover member including an internally threaded base member engaging lip companionately threaded to engage the threaded perimeter lip of the weighted base member and a positioning arm storage compartment formed therein sized to receive therein the dryer positioning arm including the connecting fitting and the flexible dryer cradle member with securing straps; the connecting fitting including two L-shaped connecting members; the connecting bracket having two L-shaped connecting member receiving channels formed therein for receiving laterally therein the two L-shaped connecting members of the connecting fitting.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1A is a perspective view of the underside of the hollow, dome-shaped base cover member showing the internally threaded base member engaging lip, the positioning arm storage compartment, and the connecting bracket.

FIG. 1B is a perspective view of the hollow, dome-shaped base cover member threaded onto the base member to form a closed storage compartment for the positioning arm including the connecting fitting and the dryer cradle member.

FIG. 3 is a perspective view of the hair dryer positioning system of FIG. 1 with the two L-shaped connecting members of the connecting fitting positioned within the two L-shaped connecting member receiving channels of the connecting bracket; the air discharge barrel of a representative hand held hair dryer secured within the dryer cradle member by the two securing straps; and the hollow, dome-shaped base cover member screwed onto the threaded perimeter lip of the weighted base member, the weighted base member being secured to the wall surface with screws positioned through the screw mount apertures and secured to the wall.

EXEMPLARY MODE FOR CARRYING OUT THE INVENTION

Figure 1:
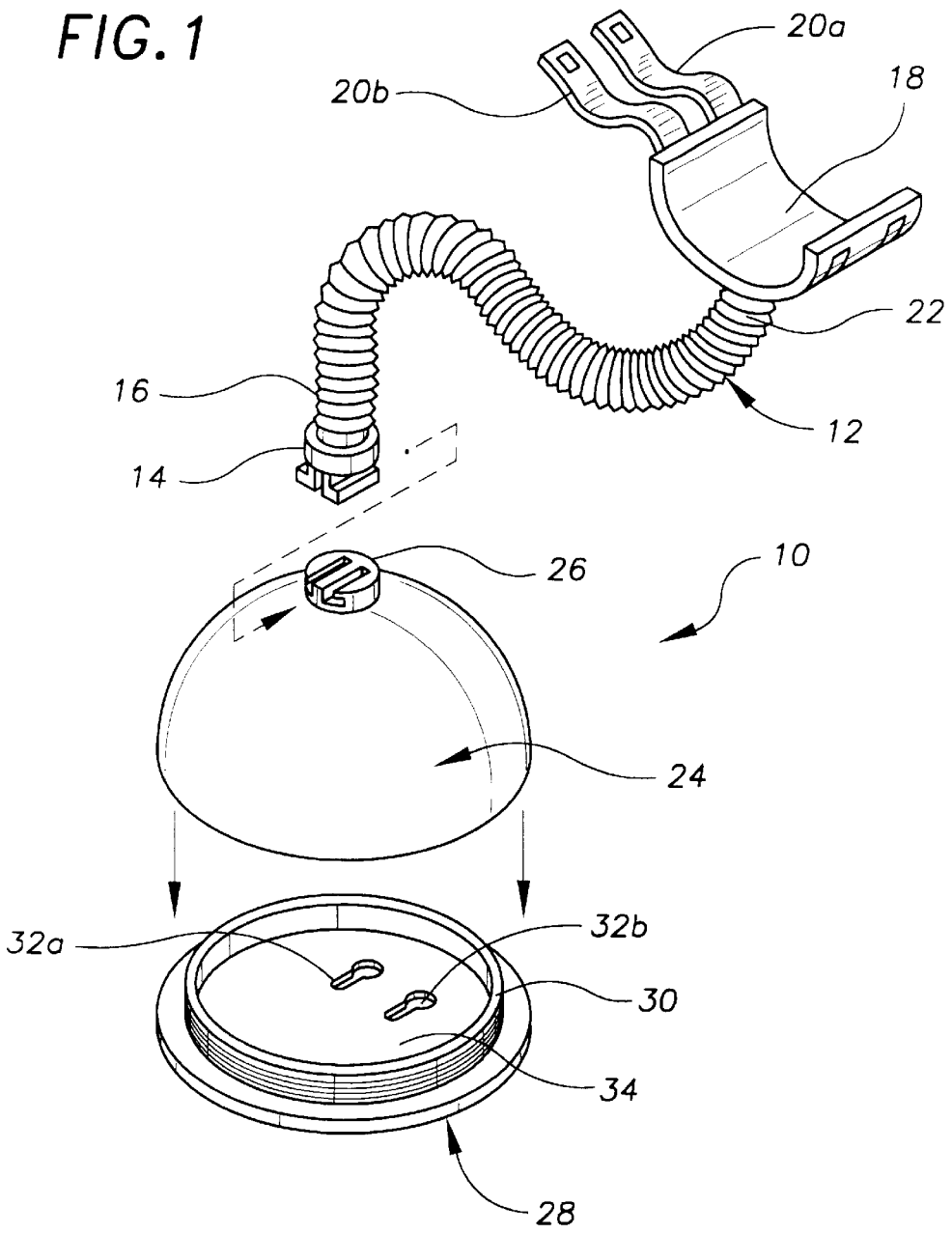
FIG. 1 is an exploded perspective view of an exemplary embodiment of the hair dryer positioning system of the present invention showing the detachable, bendable, shape retaining, dryer positioning arm with the connecting fitting at the bottom end thereof and the flexible dryer cradle member with securing straps at the top end thereof; the hollow, dome-shaped base cover member with the connecting bracket at the top center thereof; and the weighted base member with the threaded perimeter lip and the screw mount apertures.

FIG. 1 shows an exemplary embodiment of the hair dryer positioning system of the present invention generally designated by the numeral 10. Hair dryer positioning system 10 includes a detachable, bendable, shape retaining, dryer positioning arm, generally designated by the numeral 12, having a molded plastic connecting fitting 14 at a bottom end 16 thereof and a flexible, resilient plastic, channel shaped dryer cradle member 18 having a pair of hook and pile fastener securing straps 20a,20b at a top end 22 thereof; a hollow, molded plastic, dome-shaped base cover member, generally designated 24, having an integrally formed, molded plastic connecting bracket 26 at a top center thereof; and a weighted base member, generally designated 28, having a threaded perimeter lip 30 and two screw mount apertures 32a,32b formed through a bottom base surface 34 thereof. Screw mount apertures 32a,32b are provided for securing base member 28 to a vertical surface, such as a wall or door, if desired. With reference to FIG. 1A, dome-shaped base cover member 24 has a positioning arm storage compartment 36 formed therein accessible through an opening 37 defined by an internally threaded base member engaging lip 38. Base member engaging lip 38 is companionately threaded to engage threaded perimeter lip 30 (FIG. 1) of base member 28 (FIG. 1B) and, with reference to FIG. 1B, to seal positioning arm 12 (FIG. 1) within positioning arm storage compartment 36 (FIG. 1A) for travel or packing within a suitcase, handbag or purse.

Figure 2:
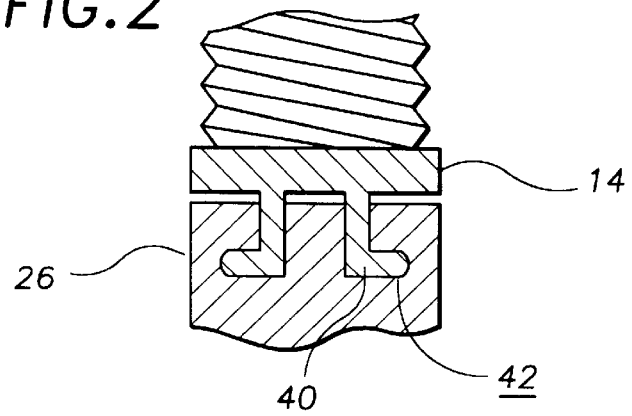
FIG. 2 is a detail cross sectional view through the bottom end of the dryer positioning arm, the connecting fitting including the two L-shaped connecting members, and the connecting bracket with the two L-shaped connecting member receiving channels.

With reference to FIG. 2, in this embodiment, connecting fitting 14 has two L-shaped connecting members 40 and connecting 10 bracket 26 has two L-shaped connecting member receiving channels 42. L-shaped connecting member receiving channels 42 are sized and spaced to allow lateral insertion of L-shaped connecting members 40 therein to, with reference now to FIG. 3, secure bottom end 16 of positioning arm 12 to base cover member 24. During use, the air discharge barrel 46 of a hand held hair dryer 48 is secured within dryer cradle member 18 by the two securing straps 20a,20b. Positioning arm 12 is then manipulated by the user to orient discharge barrel 46 in the desired direction.

Figure 4:
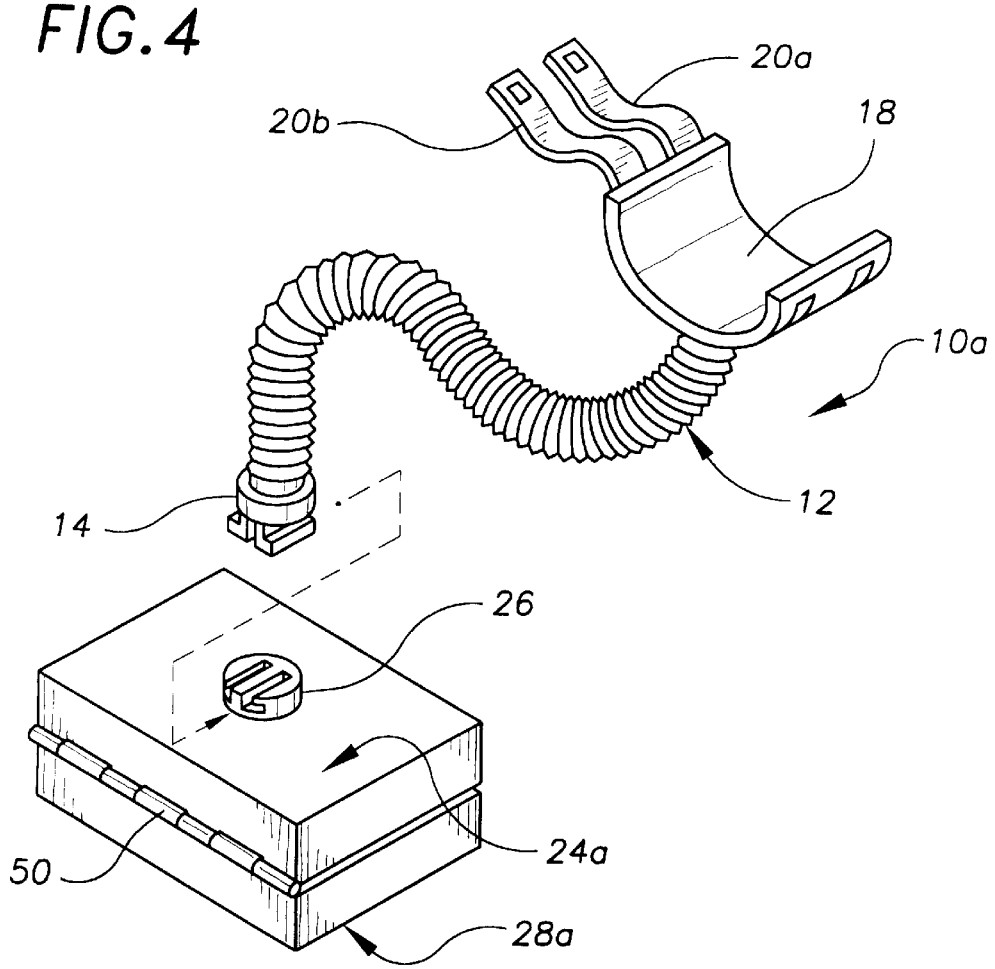
FIG. 4 is an exploded perspective view showing another exemplary embodiment of the hair dryer positioning system of the present invention that includes a detachable, bendable, shape retaining, dryer positioning arm with the connecting fitting at the bottom end thereof and a flexible dryer cradle member with securing straps at the top end thereof that are identical to the embodiment shown in FIG. 1; and a second exemplary hollow, box-shaped base cover member having a connecting bracket at the top center thereof and that is connected with a hinge to a second exemplary box shaped, weighted base member.
Figure 5:
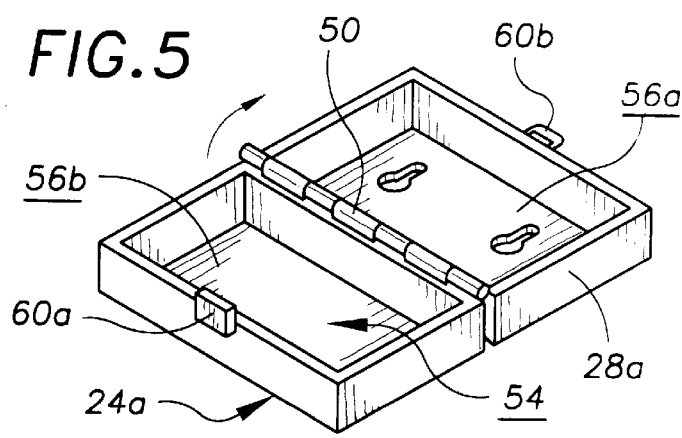
FIG. 5 is a perspective view showing the second exemplary hollow, box-shaped base cover member pivoted into the open position at the hinge to show the dual cavity positioning arm storage compartment formed by the second exemplary hollow, box-shaped base cover member and the second exemplary box shaped, weighted base member; and the first and second snap closure portions.
Figure 6:
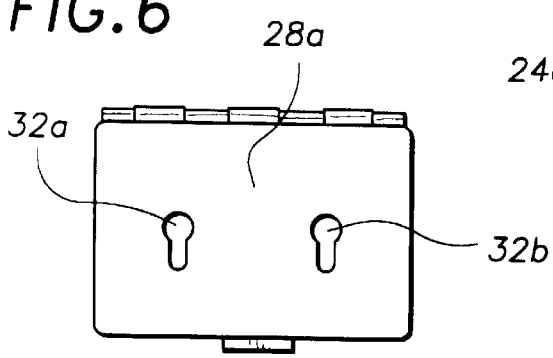
FIG. 6 is an underside plan view of the second exemplary box-shaped, weighted base member showing the screw mount apertures for securing the second exemplary box-shaped weighted base to vertical surfaces such as walls or doors.

FIG. 4 shows another exemplary embodiment of the hair dryer positioning system of the present invention, generally designated 10a. Hair dryer positioning system 10a includes a detachable, bendable, shape retaining, dryer positioning arm 12 with the connecting fitting 14 at the bottom end thereof and a flexible dryer cradle member 18 with securing straps 20a,20b at the top end thereof that are identical to hair dryer positioning system 10 (FIG. 1); and a second exemplary hollow, box-shaped base cover member, generally designated 24a having a connecting bracket 26 at the top center thereof and that is connected with a hinge 50 to a second exemplary box shaped, weighted base member 28a. Referring to FIG. 5, hollow, box-shaped base cover member 24a pivots at hinge 50 into an open position to allow dryer positioning arm 12 (FIG. 4) and flexible dryer cradle member 18 (FIG. 4) to be stored within a positioning arm storage compartment, generally designated 54, that is formed from the connection of two compartment cavities 56a,56b. Hollow, box-shaped base cover member 24a and box shaped, weighted base member 28a are held in the closed configuration by first and second snap closure portions 60a,60b. Referring to FIG. 6, box-shaped, weighted base member 28a has a pair of screw mount apertures 32a,32b for securing box-shaped weighted base 28a to vertical surfaces such as walls or doors.

It can be seen from the preceding description that a hair dryer positioning system has been provided that includes a support arm that is attachable to a hair dryer and that can hold the discharge barrel of a hair dryer at a user selected position and orientation; that includes a base that is positionable on horizontal surfaces such as table tops and mountable on vertical surfaces such as doors or walls depending on the needs of the user; that includes a base having a compartment formed therein within which the other components of the hair dryer positioning system are storable; and that includes a detachable, bendable, shape retaining, dryer positioning arm having a connecting fitting at a bottom end thereof and a flexible dryer cradle member with securing straps at a top end thereof; a hollow, dome-shaped base cover member with a connecting bracket at the top center thereof that is mateable with the connecting fitting of the positioning arm; and a weighted base member with a threaded perimeter lip and at least one screw mount aperture formed through a bottom surface thereof; the hollow, dome-shaped base cover member including an internally threaded base member engaging lip companionately threaded to engage the threaded perimeter lip of the weighted base member and a positioning arm storage compartment formed therein sized to receive therein the dryer positioning arm including the connecting fitting and the flexible dryer cradle member with securing straps; the connecting fitting including two L-shaped connecting members; the connecting bracket having two L-shaped connecting member receiving channels formed therein for receiving laterally therein the two L-shaped connecting members of the connecting fitting.

It is noted that the embodiment of the hair dryer positioning system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A hair dryer positioning system comprising:
   a detachable, bendable, shape retaining, dryer positioning arm having a connecting fitting at a bottom end thereof and a flexible dryer cradle member with securing straps at a top end thereof;
   a hollow, base cover member with a connecting bracket at a top center thereof that is mateable with said connecting fitting of said positioning arm;
   and a weighted base member that is attachable to said base cover member;
   said hollow, base cover member having at least a portion of a positioning arm storage compartment formed therein sized to receive therein said dryer positioning arm including said connecting fitting and said flexible dryer cradle member with securing straps.

2. The hair dryer positioning system of claim 1, wherein:
   said base cover member is dome-shaped.

3. The hair dryer positioning system of claim 2, wherein:
   said base member has at least one screw mount aperture formed through a bottom surface thereof.

4. The hair dryer positioning system of claim 3 wherein:
   said base member has a threaded perimeter lip; and
   said hollow, base cover member includes an internally threaded base member engaging lip companionately threaded to engage said threaded perimeter lip of said weighted base member.

5. The hair dryer positioning system of claim 3 wherein:
   said connecting fitting includes two L-shaped connecting members; and
   said connecting bracket has two L-shaped connecting member receiving channels formed therein sized for receiving laterally therein said two L-shaped connecting members of said connecting fitting.

6. The hair dryer positioning system of claim 4 wherein:
   said connecting fitting includes two L-shaped connecting members; and
   said connecting bracket has two L-shaped connecting member receiving channels formed therein sized for receiving laterally therein said two L-shaped connecting members of said connecting fitting.

7. The hair dryer positioning system of claim 2 wherein:
   said base member has a threaded perimeter lip; and
   said hollow, base cover member includes an internally threaded base member engaging lip companionately threaded to engage said threaded perimeter lip of said weighted base member.

8. The hair dryer positioning system of claim 7 wherein:
   said connecting fitting includes two L-shaped connecting members; and
   said connecting bracket has two L-shaped connecting member receiving channels formed therein sized for receiving laterally therein said two L-shaped connecting members of said connecting fitting.

9. The hair dryer positioning system of claim 2 wherein:
   said connecting fitting includes two L-shaped connecting members; and
   said connecting bracket has two L-shaped connecting member receiving channels formed therein sized for receiving laterally therein said two L-shaped connecting members of said connecting fitting.

10. The hair dryer positioning system of claim 1, wherein:
    said base member has at least one screw mount aperture formed through a bottom surface thereof.

11. The hair dryer positioning system of claim 10 wherein:
    said base member has a threaded perimeter lip; and
    said hollow, base cover member includes an internally threaded base member engaging lip companionately threaded to engage said threaded perimeter lip of said weighted base member.

12. The hair dryer positioning system of claim 11 wherein:
    said connecting fitting includes two L-shaped connecting members; and
    said connecting bracket has two L-shaped connecting member receiving channels formed therein sized for receiving laterally therein said two L-shaped connecting members of said connecting fitting.

13. The hair dryer positioning system of claim 10 wherein:
    said connecting fitting includes two L-shaped connecting members; and
    said connecting bracket has two L-shaped connecting member receiving channels formed therein sized for receiving laterally therein said two L-shaped connecting members of said connecting fitting.

14. The hair dryer positioning system of claim 1 wherein:
    said base member has a threaded perimeter lip; and
    said hollow, base cover member includes an internally threaded base member engaging lip companionately threaded to engage said threaded perimeterlip of said weighted base member.

15. The hair dryer positioning system of claim 14 wherein:

said connecting fitting includes two L-shaped connecting members; and said connecting bracket has two L-shaped connecting member receiving channels formed therein sized for receiving laterally therein said two L-shaped connecting members of said connecting fitting.

16. The hair dryer positioning system of claim 1 wherein:

said connecting fitting includes two L-shaped connecting members; and said connecting bracket has two L-shaped connecting member receiving channels formed therein sized for receiving laterally therein said two L-shaped connecting members of said connecting fitting.

17. The hair dryer positioning system of claim 1 wherein:

said weighted base member and said hollow, base cover member are connected with a hinge.

18. The hair dryer positioning system of claim 17 wherein:

said connecting fitting includes two L-shaped connecting members; and said connecting bracket has two L-shaped connecting member receiving channels formed therein sized for receiving laterally therein said two L-shaped connecting members of said connecting fitting.

\* \* \* \* \*